United States Patent
Holmes et al.

[11] 3,882,024
[45] May 6, 1975

[54] HEADER FOR STAGNATION-SENSITIVE LIQUIDS

[75] Inventors: George W. Holmes, Walnut Creek; Charles E. Savage, Concord, both of Calif.

[73] Assignee: The Dow Chemical Company, Midland, Mich.

[22] Filed: Apr. 19, 1974

[21] Appl. No.: 462,275

[52] U.S. Cl. .................. 210/321; 210/433; 210/450
[51] Int. Cl. ............................................. B01d 33/00
[58] Field of Search .............. 210/23, 321, 433, 450

[56] References Cited
UNITED STATES PATENTS

| 796,266 | 8/1905 | Sutton | 210/450 |
| 3,240,342 | 3/1966 | Callahan, Jr. et al. | 210/450 X |
| 3,353,678 | 11/1967 | Dragon | 210/450 X |
| 3,361,261 | 1/1968 | Fairey et al. | 210/450 X |
| 3,442,002 | 5/1969 | Geary, Jr. et al. | 210/321 X |
| 3,498,909 | 3/1970 | Littman | 210/321 X |
| 3,557,963 | 1/1971 | Offer | 210/450 X |

*Primary Examiner*—Frank A. Spear, Jr.
*Attorney, Agent, or Firm*—Robert R. Stringham

[57] ABSTRACT

A generally cup-shaped header has a rim grooved to receive an O-ring. The inner wall of the groove is not as high as the outer wall and is smoothly contoured at the top and base. When an O-ring is compressed into the groove and against a generally flat opposing surface, a seal is effected without leaving zones where liquid can stagnate. The header has particular utility in directing the flow of liquids like blood or high polymer solutions which tend to clot, gel or phase-separate in quiescent zones.

10 Claims, 4 Drawing Figures

HEADER FOR STAGNATION-SENSITIVE LIQUIDS

BACKGROUND OF THE INVENTION

It has been discovered that a cause of clotting in certain types of blood-treating devices — such as the so-called hollow fiber artificial kidney (H.F.A.K.) — is the presence of quiescent zones in which blood can stagnate.

The H.F.A.K. is a relatively recently developed dialysis cell in which the membrane takes the form of a bundle of thousands of generally parallel, hair-like hollow fibers. The cell has the general configuration of a shell and tube heat exchanger. The "tubesheets" are bodies of solidified potting resin through which the fiber ends pass in sealing engagement. These tubesheets are peripherally sealed in a cylindrical jacket provided with fluid inlet and outlet connections. The fiber ends open into headers which are joined in sealing relationship with the jacket ends or with the peripheral portions of the tubesheet surfaces.

In a design which facilitates assembly and disassembly, a seal is effected by an O-ring inserted in a groove (or land) in a header face (or rim) of conventional design. The O-ring is urged against a tubesheet surface by a collar which fits around the header and threads onto the jacket end. The groove in the header face is an annulus of generally square cross-section and the walls on each side of the groove are about equal in thickness to the width of the groove. It has been found that H.F.A.K. units incorporating headers of this design, although fully operable as dialysis units, tend to become clotted — particularly when used with certain clotting-prone patients. It has been discovered that this clotting originates in stagnant zones formed as peripheral recesses defined by the header faces, the tubesheet surfaces and the exposed portions of the O-rings.

It is an object of the present invention to provide an improved header design which eliminates the latter source of clotting. A further object is to provide a unitary, molded plastic header of the improved design which has a minimal blood volume and is readily removable from the mold used to make it. Yet another object is to provide a header which, with a cooperating O-ring, can be used not only with blood but also with other liquids susceptible to gelling or phase separation in quiescent or stagnate zones.

SUMMARY OF THE INVENTION

The invention is a header having the general shape of a cup, pierced by at least one fluid passageway and having a generally cylindrical rim. The rim comprises outer and inner wall members, $W_o$ and $W_i$, projecting generally parallel to the axis of the rim and in a direction such as to increase the volume of fluid containable by the header. $W_o$ and $W_i$ have concentric, opposed, generally cylindrical faces of greater and lesser radii, $r_o$ and $r_i$ respectively, which define an annular land having a bottom width equal to $(r_o-r_i)$ and of greater and lesser heights, $h_o$ and $h_i$ respectively. The ratio of $h_o$ to $(r_o-r_i)$ is from about 0.6 to about 0.8 and the ratio of $h_i$ to $(r_o-r_i)$ is from about 0.45 to about 0.65. The inner wall member, $W_i$, has a generally tapered cross-section and comprises a rounded uppermost portion having a thickness at the line of inflection, of from about 0.2 $(r_o-r_i)$ to about 0.3 $(r_o-r_i)$.

Preferably, the side of $W_i$ distal from the land is joined to the rim of the header by a smooth, concave surface.

It is also preferred that the header comprises means for connecting the fluid passageway (through the bottom of the cup) to a conduit. A particularly preferred embodiment is one in which said means is a nipple integrally molded with the header from a thermoplastic resin.

In another preferred embodiment, the width of the O-ring groove (the land) is restricted at circumferentially spaced-apart "pinch points," i.e. small bulges in either of the opposed surfaces of the two wall members so that a resilient O-ring inserted in the groove will not fall out when the header is inverted.

An embodiment which is particularly preferred for incorporation in a blood treating unit is a header having the shape of a shallow, generally flat-bottomed cup (i.e., a saucer shape). This shape minimizes the volume of blood required to prime such a unit.

DETAILED DESCRIPTION OF THE INVENTION

Figure 1:
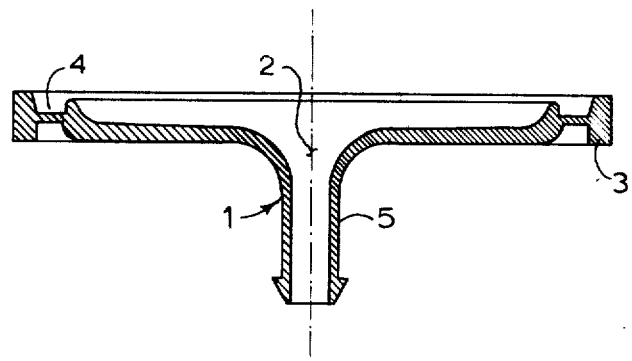
FIG. 1 is a cross-section of the header.

Referring to the drawings, FIG. 1 depicts a diametric cross-section of a shallow, generally flat-bottomed header 1 pierced by a fluid passageway 2 and having a generally cylindrical rim 3 grooved by a land 4. An integrally molded nipple 5 constitutes means for connecting the fluid passageway to a conduit. Alternatively, a nipple or a conduit-end not integral with the header can be connected to it by means of suitable threads cut into the header surface defining the fluid passageway.

Figure 2:
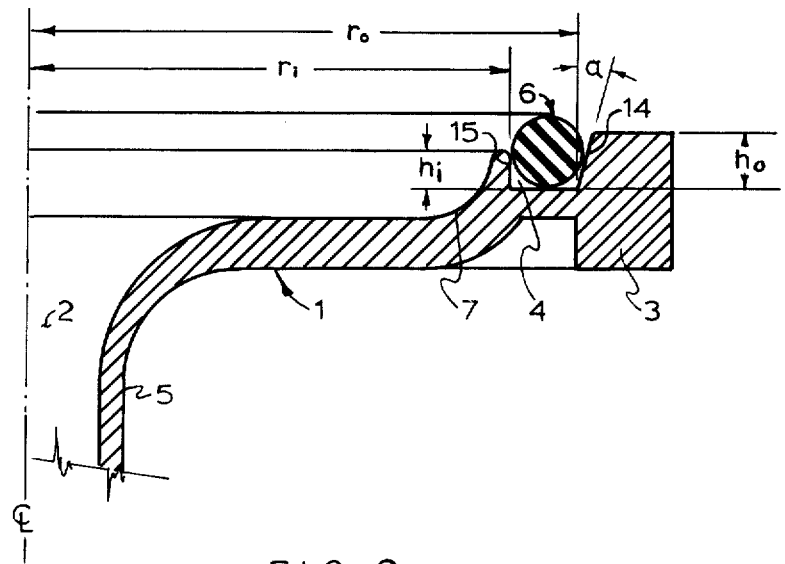
FIGS. 2 and 3 are partial cross-section of the header.

FIG. 2 depicts a partial and enlarged cross-section of the header shown in FIG. 1 and including an O-ring 6 which is inserted in the land 4. The angle $\alpha$ between the inner surface of $W_o$ 14 and a line parallel to the axis (center-line, ₵ ) can vary from 0° to about 6° but preferably is about 4.5° to about 5.5°. When $\alpha$ is greater than 0°, removal of the header from a mold is facilitated. The width of land 4 is equal to the difference between the least radii ($r_o$ and $r_i$) of the opposed surfaces of wall members $W_o$ 14 and $W_i$ 15. The height ($h_o$) of $W_o$ can vary from about 0.6 $(r_o-r_i)$ to about 0.8 $(r_o-r_i)$. $H_i$, the height of $W_i$, can vary from about 0.45 $(r_o-r_i)$ to about 0.65 $(r_o-r_i)$ but is always less than $h_o$. Preferably, the ratio of $h_i$ to $h_o$ is about 0.75 to about 0.85.

Figure 3:
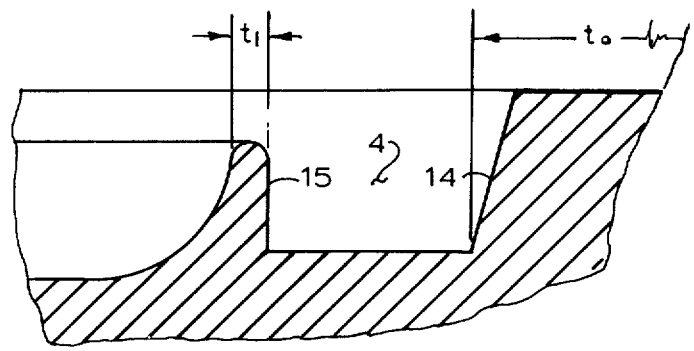

FIG. 3 depicts the wall members 14 and 15 and land 4 in still more detail. The radial thickness, $t_o$, of the outer wall 14 is not critical but will generally be at least equal to 0.1 $(r_o-r_i)$. The radial thickness, $t_i$, of the uppermost portion of the inner wall 15, measured along a radius through any point on the circle of juncture between the cylindrical and non-cylindrical surfaces of the wall, is from about 0.2 $(r_o-r_i)$ to about 0.3 $(r_o-r_i)$. Preferably, $t_i$ is $(0.25 \pm 0.01)$ $(r_o-r_i)$.

Returning to FIG. 2, the uncompressed cross-sectional diameter of the resilient O-ring 6 is from about 0.7 $(r_o-r_i)$ to about 0.95 $(r_o-r_i)$.

Figure 4:
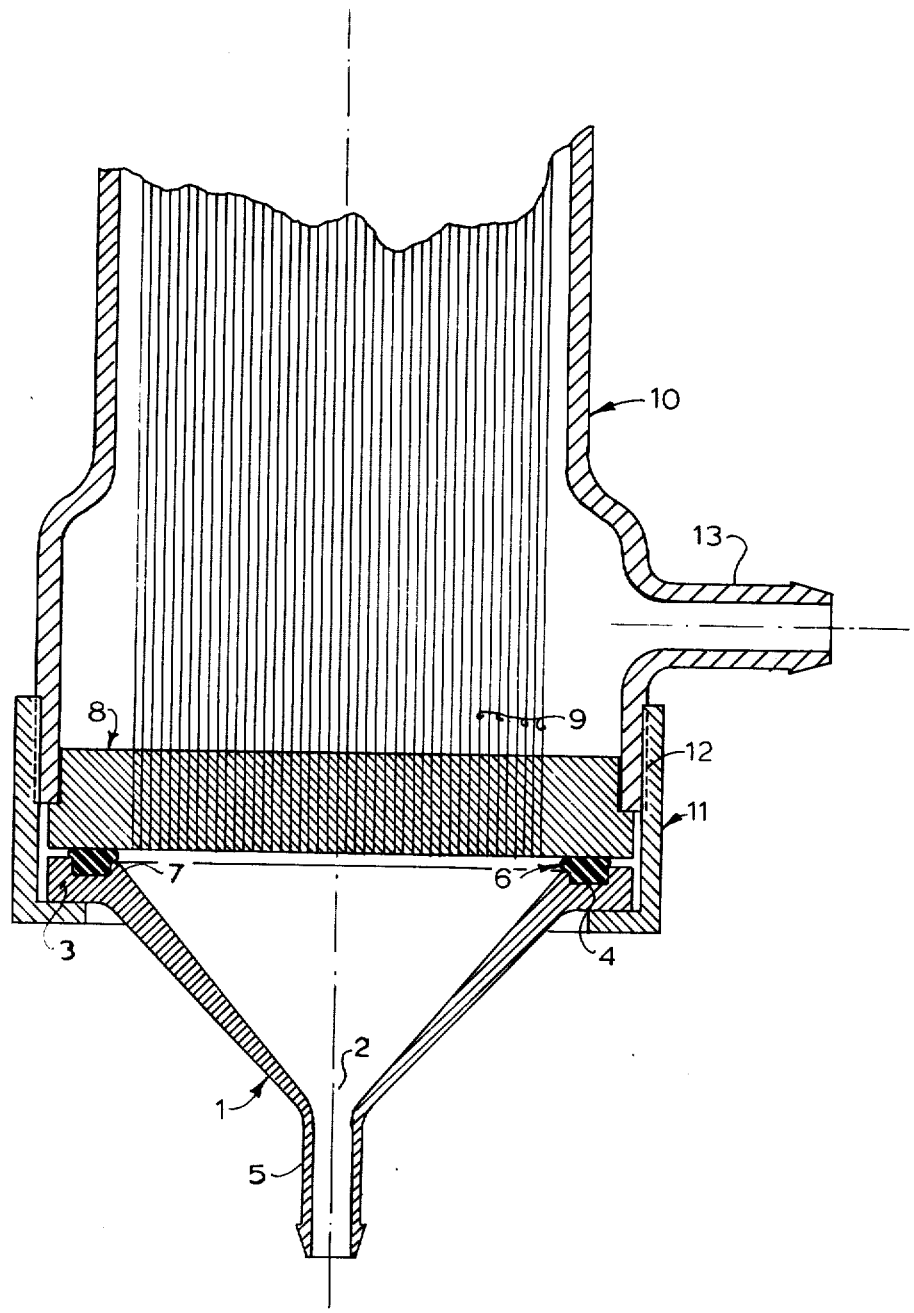
FIG. 4 is the header shown in a fluid processing device.

FIG. 4 depicts one end of a fluid processing device in which a header 1 of the present invention is opeatively coupled to a generally cylindrical shell 10 containing a plurality of hollow fibers 9 having end portions potted in a resinous tubesheet 8 and opening upon a generally flat surface thereof. The cylindrical peripheral surface of the tubesheet is sealingly engaged with the adjacent end-portion of the shell. The header is coupled to the shell by collar 11, screwed on to threads 12 so that the resilient O-ring is compressed into land 4 and urged against and in sealing engagement with a peripheral annular portion of said flat surface.

Methods of making hollow fiber/tubesheet/jacket assemblies, such as is shown in FIG. 4, are described in several patents and publications. See, for example, U.S. Pat. Nos. 3,228,876; 3,373,876; 3,423,491; 3,546,209; 3,722,695 and 3,755,034. Medically approved materials for fabrication of headers, tubesheets and fibers are also well known.

If semi-permeable hollow fibers are employed in a device of the type shown in FIG. 4, a variety of stagnation sensitive fluids may be subjected to such processes as dialysis or ultrafiltration. If impermeable fibers are used, the device can be operated as a heat exchanger.

The header configuration shown in FIG. 4 results in a larger priming volume and is therefore less desirable for use in blood-treating devices. However, this design meets the critical requirement of the present invention, i.e., that quiescent zones are eliminated.

FIG. 4 also illustrates other options as to the header configuration. The portion 7 of the surface of the inner wall which is distal from the land 4 is not concave in this design. Also, the back (or outer) face of the rim 3 is not hollowed out, as in the header of FIGS. 1–3. Better flow of the molten resin during molding results if the back of the rim is not hollowed out. Also, shrinkage-induced distortion is minimized if the thickness of the rim does not vary radically from one section to the next. In other words, the back surface of the rim preferably is generally flat and parallel to the bottom of the land.

It is evident from FIG. 4 that the header 1 could include the collar 11 as an integrally molded unit. This possibility is not limited to the particular header and collar configurations depicted in FIG. 4 but extends generically to headers of the present invention, as defined in Claim 1 herein.

The relative proportions of $h_o$, $h_i$ and $t_i$ to each other and to $(r_o-r_i)$ set out under the discussion of FIG. 2 holds also for the header of FIG. 4 and to all headers of the present invention. Any dimensions or proportions which have not been stated herein are not critical.

Any suitable means for coupling a header to a shell, tubesheet and fiber assembly may be employed, but it is a particular advantage of headers of the present invention that they are adaptable to use with a collar (as shown in FIG. 4) which can be screwed-on or removed by hand.

EXAMPLE

Otherwise identical "kidney" units having three different O-ring groove configurations were tested in clinical use for hemodialyses of human patients. The flat, shallow header shape preferred for blood treating devices was used in all units.

Each unit contained a bundle of 13,500 cellulose hollow fibers, 200μ I.D., 260μ O.D., and 16 cm. effective length, end-potted in polyurethane elastomer tubesheets and housed in a rigid, transparent, cylindrical plastic shell. The O-rings (made from a styrene-butadiene elastomer) were held in place in injection molded polypropylene headers by pinch points in the O-ring grooves and urged against the tubesheet faces by collars threaded on the shell ends (as in FIG. 4). The shells were fitted with dialysate inlet and outlet connections. Each unit had an effective membrane surface of 1.3 square meters, a diameter of 7.7 cm, a length of 21.5 cm and blood and dialysate volumes of 100 ml. each.

Blood from the heparinized patient was passed through the headers and fiber lumen at a rate of 200 cc/min and dialysate was passed through the shell and fiber bundle at a rate of 500 cc/min. After dialysis, each unit was opened and inspected.

In the first header design, the configuration of the O-ring groove (land) was as shown in FIGS. 2 and 3 of the drawings. Dialyses with 52 units of this type were carried out in routine clinical procedures. Essentially no clotting other than the minor amounts often occurring on tubesheet surfaces was observed and the collars could easily be removed by hand.

In the second design, the groove configuration differed from that of the first design in that the height of the inner wall was greater, rather than less, than the height of the outer wall. When the O-ring was compressed, the top of the inner wall just reached the tubesheet surface. However, perfect sealing was not attained around the entire periphery because the tubesheet surfaces in units of the type used are not perfectly flat. After just two dialyses had been attempted with units having headers of this kind, the design was abandoned due to extremely heavy clotting.

In the third design, both the inner and outer walls had the configuration of the outer wall in FIGS. 2 and 3. That is, both walls were flat topped, were of a height equal to about 0.6 $(r_o-r_i)$ and were about as thick as the land was wide. Although this design was generally satisfactory, clotting occurred in a substantial percentage of clinical dialyses. In each instance where clotting occurred, it was apparent that the clot had originated in the spaces between the tubesheet surfaces and the tops of the inner walls.

We claim:

1. A header having the general shape of a cup, pierced by at least one fluid passageway and having a generally cylindrical rim comprising outer and inner wall members, $W_o$ and $W_i$, projecting generally parallel to the axis of the rim in a direction such as to increase the volume of fluid containable by the header and having concentric, opposed, generally cylindrical faces of greater and lesser radii, $r_o$ and $r_i$, respectively, defining an annular land having a bottom width equal to $(r_o-r_i)$ and of greater and lesser heigths, $h_o$ and $h_i$, respectively, said inner wall member $W_i$ having a tapered cross section and comprising a rounded uppermost portion having a thickness $t_i$ measured along a radius through any point in the circle of juncture between the cylindrical and non-cylindrical surfaces of $W_i$, the ratio of $h_o$ to $(r_o-r_i)$ being from about 0.6 to about 0.8, the ratio of $h_i$ to $(r_o-r_i)$ being from about 0.45 to about 0.65 and the ratio of $t_i$ to $(r_o-r_i)$ being from about 0.2 to about 0.3.

2. A header as in claim 1 comprising means for connecting said passageway to a conduit.

3. A header as in claim 2 wherein said connecting means is a nipple extending from the outer surface of the header and integrally molded therewith from a thermoplastic resins.

4. A header as in claim 3 wherein the inner, generally cylindrical surface of $W_o$, has a minimum radius $r_o$ and is inclined at an angle $\alpha$ to said axis so that said land is wider at the top than at the bottom, $\alpha$ having a magnitude of from about 4.5° to about 5.5°.

5. A header as in claim 3 having the shape of a shallow, generally flat bottomed cup, wherein the side of said inner wall member distal from said land is joined to said rim by a smooth, concave surface.

6. A header as in claim 5 in which the back surface of said rim is generally flat and parallel to the bottom of said land.

7. A header as in claim 1 in which the width of said land is restricted at circumferentially spaced apart pinch points consisting of small bulges in either of said opposed surfaces.

8. A header as in claim 1 having inserted in said land a resilient O-ring having an uncompressed cross-sectional diameter of from about 0.7 $(r_o-r_i)$ to about 0.95 $(r_o-r_i)$.

9. A header as in claim 8 operatively coupled to a generally cylindrical shell containing a plurality of hollow fibers having end portions potted in a resinous tubesheet and opening upon a generally flat surface thereof, said tubesheet having a cylindrical peripheral surface bonded in sealing engagement with the adjacent end portion of said shell and said resilient O-ring being compressed in said land and urged in sealing engagement with a peripheral annular portion of said flat surface.

10. A header as in claim 1 in which the ratio of $h_i$ to $h_o$ is from about 0.75 to about 0.85 and the ratio of $t_i$ to $(r_o-r_i)$ is 0.25 ± 0.01.

* * * * *